Jan. 2, 1951 L. SHAKESBY 2,536,317
MACHINE FOR TENSIONING WIRE SPOKED WHEELS
Filed Nov. 4, 1949 4 Sheets-Sheet 1

Inventor
LEONARD SHAKESBY
By: Fetherstonhaugh & Co.
Att'ys

Jan. 2, 1951     L. SHAKESBY     2,536,317
MACHINE FOR TENSIONING WIRE SPOKED WHEELS
Filed Nov. 4, 1949     4 Sheets-Sheet 2

Inventor
LEONARD SHAKESBY
By: Fetherstonhaugh & Co,
Att'ys

Jan. 2, 1951 L. SHAKESBY 2,536,317
MACHINE FOR TENSIONING WIRE SPOKED WHEELS
Filed Nov. 4, 1949 4 Sheets-Sheet 3

Inventor
LEONARD SHAKESBY
By: Fetherstonhaugh & Co.
Att'ys

Patented Jan. 2, 1951

2,536,317

UNITED STATES PATENT OFFICE 2,536,317

MACHINE FOR TENSIONING WIRE SPOKED WHEELS

Leonard Shakesby, Weston, Ontario, Canada, assignor to Canada Cycle and Motor Company Limited, Weston, Ontario, Canada, a corporation of Ontario Application November 4, 1949, Serial No. 125,595

12 Claims. (Cl. 157—1.5)

1

This invention relates to machines for tensioning wire spoked wheels and particularly bicycle wheels.

In the past, wire spoked wheels have been tensioned in some cases by hand, in conjunction with apparatus designed to indicate the trueness of the rim in relation to tightened spokes so that certain of the spokes may be further tightened or loosened as required. In other cases, machines have been employed operable to engage the free end of the spoke nipples within the rim channel to tension all spokes substantially uniformly. A machine of this kind presents advantages over the hand method by reason of increased speed of the operation. However, disadvantages also result from the use of such machines since it is difficult to locate tightening elements in the turning slot of the nipples and to avoid this difficulty, elements have been employed, designed in effect to bite into the free ends of the spoke nipples and in result the spoke nipple is injured such that later when it might be necessary to readjust these nipples, it is impossible to employ a screw driver or the like for effecting this operation in the normal manner.

The present invention avoids the general disadvantages of the prior art by providing a machine through which the spokes of spoke wheels may be uniformly tensioned in one operation and in which the spoke nipples are manipulated in a simple manner to accomplish this result without damage to them.

According to the invention, the spoke nipples are engaged by rotatable tensioning elements disposed inwardly of the circumference of the wheel rim and which operate to straddle the spokes and move outwardly towards the rim to engage the flats of the spoke nipples, said rotatable means being caused to rotate simultaneously to tension the spokes uniformly and preferably by means of pressure supplied from a common source and distributed substantially uniformly in respect to each rotary spoke tightener whereby in one operation the spokes of a wheel are tensioned uniformly throughout the wheel and within a required tolerance. The invention will be fully understood by reference to the following detailed specification taken in conjunction with the accompanying drawings:

In the drawings,

Figure 1 is a perspective view of one form of machine which may be employed according to the present invention illustrating the clamping base on which the wheel may be disposed and some of the operating mechanism.

2

Figure 1:
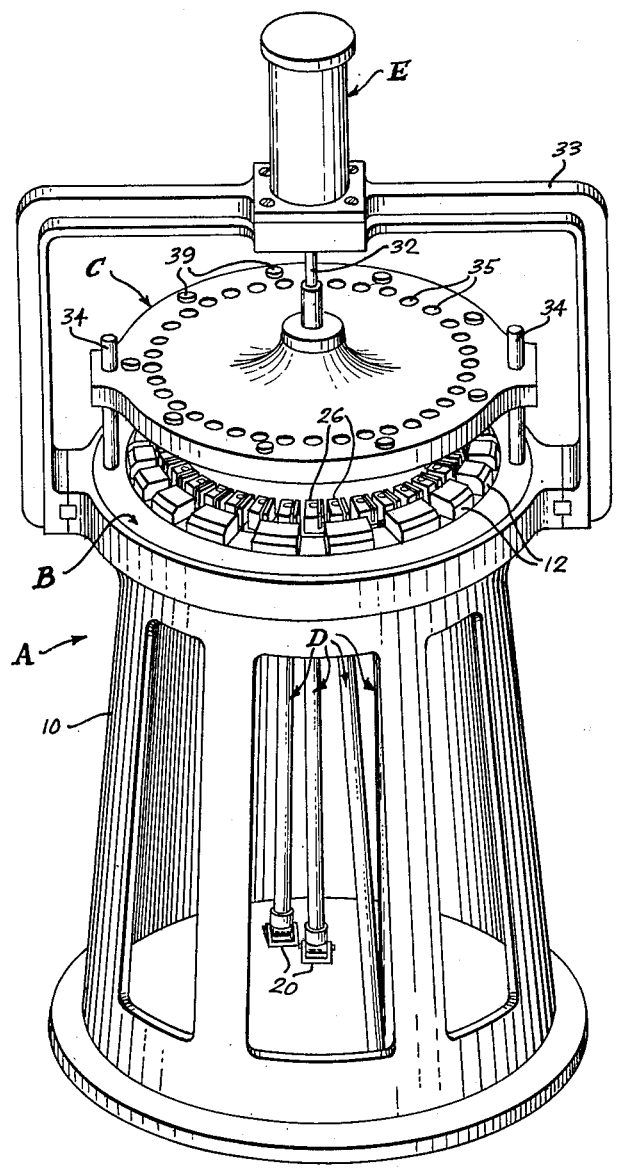
Figure 2:
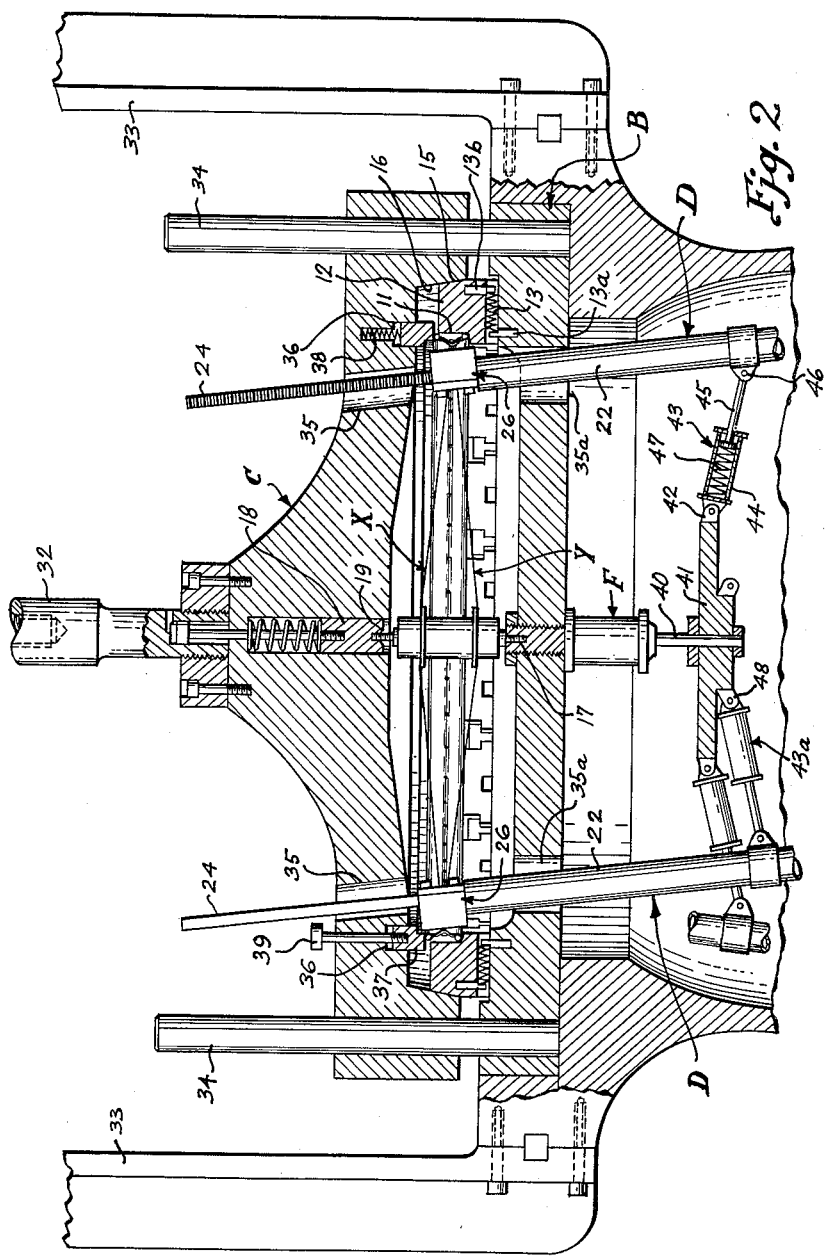
Figure 2 is an enlarged fragmentary longitudinal section taken through the machine showing a spoked wheel clamped on the clamping base and certain of the spoke tightening elements of the machine disposed to engage the spoke nipples.
Figure 6:
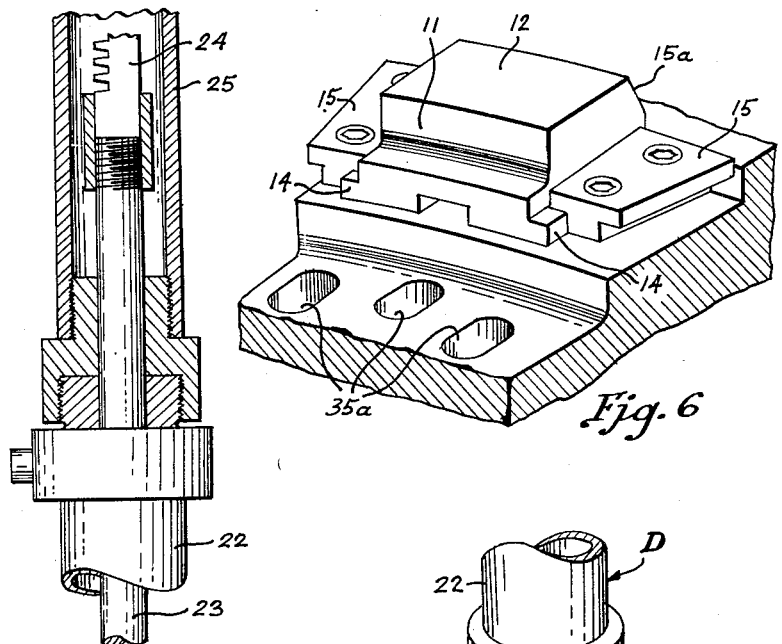
Figure 6 is an enlarged fragmentary perspective view of part of the clamping base for the machine to illustrate some of its details.

Referring to the drawings, A indicates a spoke tensioning machine as a whole, comprising the bed frame 10 having the clamping base B designed to co-operate with the movable platen or wheel clamping element C. The clamping base is formed with a suitable annular seat 11 designed to receive the wheel rim and which is provided by the transverse angular recess in each of the circumferentially spaced apart slidable blocks 12 (Figures 2 and 6). These blocks are designed to slide radially inward and outward on the clamping base B being normally urged outwardly by the coil springs 13 (Figure 2) disposed between pins 13a and 13b carried respectively by the clamping base B and the sliding blocks 12. Blocks 12 are formed in any suitable way to slide as above described and may, as shown in Figure 6, be provided with the laterally projecting flanged guides 14 co-operating with the under-cut brackets 15 which serve to form the guide ways. The outer periphery of the blocks 12 is slightly bevelled as shown at 15a (Figures 2 and 6), which bevelled surface is designed to co-operate with the sloped interior periphery 16 of the movable platen or wheel clamping element C. Therefore, as may be visualized by a consideration of Figure 2, the engagement of the sloped surface 16 of movable clamping element C with the bevelled periphery 15 of the slidable blocks 12, when element C is moved downwardly, will have the effect of sliding the blocks 12 inwardly to engage the rim of a wheel under pressure and thus firmly clamp it in its seated position on the clamping base B.

In clamping a wheel on the clamping base of the machine, it will be noted by reference to Figure 2 that the machine is provided with a central socket 17 designed to receive one end of the spindle of the wheel, whereas the movable clamping element C is provided with a socketed spring pressed plunger 18 centrally located therein aligned with the socket 17 so that the other end of the spindle is engaged by the socketed plunger 18 and the entrance to the socket may be bevelled or flared as at 19 so that the engaging end of the spindle will be readily guided into the socket. In this way, the wheel is centered and firmly clamped in "true" position.

Figure 4:
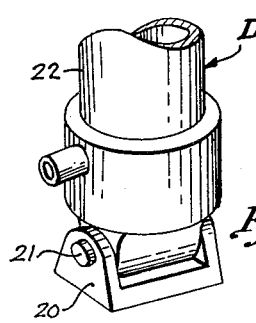
Figure 4 is an enlarged fragmentary perspective view of the base of a spoke tensioning unit and a manner in which it may be pivotally mounted on the machine.

When the wheel is initially positioned in the machine and preferably prior to the clamping of the wheel, it is desirable to dispose the spokes of the wheel in generally operative engagement with spoke tensioning means. This is readily achieved by providing a plurality of spoke tensioning units D swingably mounted on the frame by means of any suitable brackets such as the brackets 20 (Figure 4) which may be mounted on the interior wall of the base of the machine. Each unit D may be swingably mounted on the brackets by means of the pintles 21 and the number of units D employed correspond with the number of spokes in the wheel.

Figure 5:
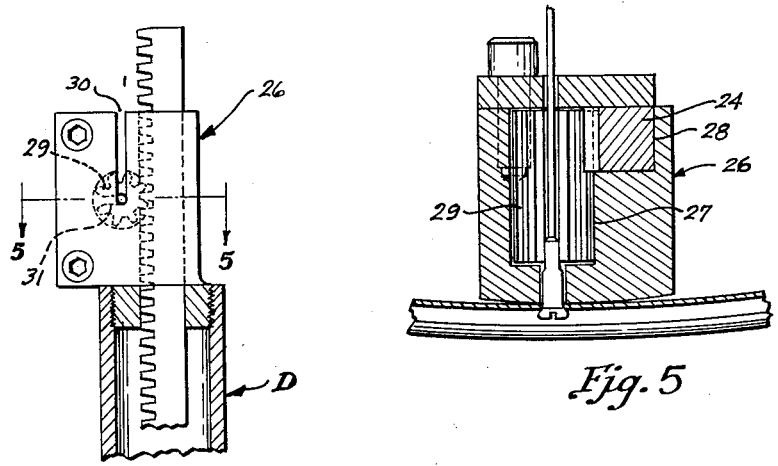
Figure 5 is a transverse sectional view taken on line 5—5 of Figure 3 through the spoke tensioning head showing more clearly its engagement with a spoke nipple adjacent the rim of a wheel.
Figure 3:
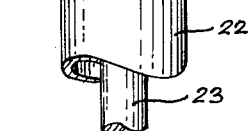
Figure 3 is an enlarged partly sectional view of one of the spoke tensioning units, illustrating in particular the spoke tensioning head having a spoke straddling slot therein, the rotary spoke tightener, and the operating element of the latter.

Basically, the units D comprise a cylinder 22 carrying a piston at the lower end of the piston rod 23 (Figure 3), the upper end of the rod 23 passing through the end of the cylinder and being connected with or taking the form of a rack 24, mainly housed within the enclosed cylindrical casing 25. At the upper end of the casing 25 a spoke tensioning head 26 is carried. This head is provided with the cylindrical recess 27 to house the pinion gear 29 and recessed as at 28 to permit passage of the rack 24. The recess 28, in effect, constitutes a passage through the head 26 to permit the rack 24 to traverse the head during operation and recess 28 intersects the recess 27 so that, as shown in Figures 3 and 5 in particular, the teeth of the rack may engage the teeth of the pinion 29. The head 26 is also slotted vertically inwardly from its top as at 30, which slot extends transversely completely across the head and intersects the recess 27 extending inwardly to a point coinciding with the centre of rotation of the pinion 29, as clearly illustrated in Figure 3. Moreover, the pinion 29 between two of its teeth, is slotted radially inwardly as at 31 to its centre, which slot extends transversely across the gear to full width of the latter. Consequently, the slot 31 in the pinion, will be caused to align and register with the slot 30 in the tensioning head during rotation of the pinion and this registration will, in particular, occur when the piston rod 23 and consequently the rack 24, are disposed at their lowermost point. As a result, therefore, since the slot 30 of each head 26. and the slot 31 of each pinion 29, are normally in registry, each time the machine is designed to be put into operation, and since the tensioning heads 26 are disposed as shown in Figure 2, at a level correlated to the position of the spokes of the wheel when the latter is disposed on the clamping base, it will be apparent that when the wheel is placed on the clamping base, the various spokes may be then caused to enter the slot 30 of each tensioning head 26 and likewise into the slot 31 of the pinion 29. Moreover, it should be noted that the pinion 29 constitutes a rotary spoke tensioning element and when the slot 31 is caused to engage the spoke nipples and, in effect, the side walls of each slot 31 are caused to embrace the opposed flattened sides of the nipples, it will be apparent that the nipples will naturally be caused to rotate when the rotary spoke tensioning element or pinion 31 is caused to rotate.

The movable wheel clamping element C is operated through the piston rod 32 in turn actuated by a piston disposed within the operating cylinder E. The latter is conveniently supported on the frame by means of the super frame work 33 and in its vertical upward and downward movement, the movable wheel clamping element C may be conveniently guided by the upwardly projecting guide posts 34 carried by the frame work and designed to pass through corresponding orifices in the element C. Moreover, as will be noted from Figure 2, the heads 26 of the spoke tensioning elements D project above the plane of the clamping base B and the racks 24, particularly in their uppermost position, project considerably above this point and above the movable clamping element C when it is in its lower position. Accordingly, therefore, the movable clamping element C is provided with a plurality of circumferentially spaced apart orifices 35 through which the racks are designed to pass as clearly illustrated in Figure 2. Moreover, as the movable tensioning elements D, and their attached racks, are designed to swing radially outward and inward to a degree (as will be hereafter explained), the diameter of the openings 35 is made sufficiently large as to permit this swinging movement. In this connection, it will be noted that the units D also pass through the orifices 35a in the clamping base B and these orifices are preferably of elongated character also to permit the swinging movement of these units.

The movable clamping element C is also preferably formed with an annular channel 36 extending inwardly from its lower face designed to house a pressure ring 37. This is of a diameter to coincide substantially with the diameter of the wheel and is designed to contact the upper peripheral edge of the rim when the latter is disposed in the clamping base as shown in Figure 2. In this connection, the ring 37 is spring compressed by a plurality of circumferentially spaced apart coil springs 38 which may alternate with the guide pins 39. Consequently, in the downward movement of the clamping element C. not only are the blocks 12 caused to move radially inward to perform their clamping function on the periphery of the wheel rim, but the pressure ring 37 is also caused to engage the uppermost peripheral edge of the rim to maintain it in its set position as it is being clamped.

When the wheel is clamped, ready for the spoke tensioning operation, it is apparent, as above indicated, that the spokes of the wheel are disposed within the co-operating slot 31 of the rotary tensioning element carried in each tensioning head 26. These heads initially are spaced inwardly of the inner periphery of the wheel rim and are designed to be moved radially outwardly, substantially to abut the inner periphery of the wheel rim and to engage the "flats" of the spoke nipples in the embracing engagement of the sides of slot 31. Moreover, it should be noted at this point that having regard to the variations in angle between each adjacent pair of spokes, i. e., the spokes X and Y (Figure 2), the adjacent tensioning units D will be disposed at a slightly different angle one to another; for instance, the tensioning unit shown in the right-hand side of Figure 2 is disposed to engage one of the spokes Y, whereas the tensioning unit D on the left-hand side of Figure 2 is designed to engage one of the spokes X and the difference in the angle at which they are disposed for this purpose, is clearly compared in this view. It will be appreciated, of course, that every alternate tensioning unit D will be disposed at an angle such as illustrated by the right-hand unit D while the others will be disposed substantially at the angle of unit D on the left-hand side of Figure 2.

The spoke tensioning units D are swung from a normal inwardly disposed position spaced inwardly from the wheel rim to an outwardly disposed operating position (Figure 2) adjacent to the wheel rim by means of the operating cylinder F. This carries a piston, the piston rod 40 of which is rigidly connected to a plate 41. The cylinder F is mounted in any suitable way on the clamping bed B axially aligned with the sockets for receiving the wheel spindles and designed to project below the clamping bed. In a suitable manner, such as by the lugs 42, a telescopic toggle link element 43 is pivotally connected to plate 41 at its periphery. The elements 43 are comprised by the cylinder 44 and link 45, which, in each element, is pivotally connected at 46 to a suitable bracket carried by the tensioning units D while the cylinder 44 contains the coil spring 47 designed to exert a pressure on the head of link 45 which is disposed within the cylinder. Every alternate unit D is in articulated connection with the periphery of the plate in this manner, while the others are connected in a similar manner by the link elements 43a which extend between the lugs 48 on the plate 41 and the other units D, but at a level below the lugs 42 and in a position spaced inward therefrom. The correlation between the two sets of link elements 43 and 43a, is such that when the plate 41 is actuated, all tensioning units D will be caused to move radially outward to a corresponding degree to engage the spoke nipples they are designed to actuate.

In Figure 2, the cylinder F has been actuated to move the plate 41 downwardly and to cause the link elements 43 and 43a to exert pressure outwardly to move the units D to their outward position where the slot 31 of the rotary tensioning element 29 is caused to straddle the "flats" of the spoke nipples. However, where the "flats" may be disposed at an angle such that the slot 31 cannot straddle the nipple, the coil spring 47 in each of the elements 43 or 43a which are affected, will yield, leaving the rotary element 29 of that particular tensioning unit or those particular units, as the case may be, disposed to abut the inner end of the spoke nipples in question. As a result, when the rotary tensioning element of each of these units is caused to rotate, as will later be explained, as soon as the slot 31 of the rotary tensioning element is aligned with the opposed "flats" of these nipples, the pressure of the coil springs 47 in the link elements 43 or 43a, as the case may be, will cause these rotary tensioning heads 26 to move to outward normal operating position since slot 31 of each rotary tensioning element affected will then straddle and engage the "flats" of the nipples in question.

Figure 7:
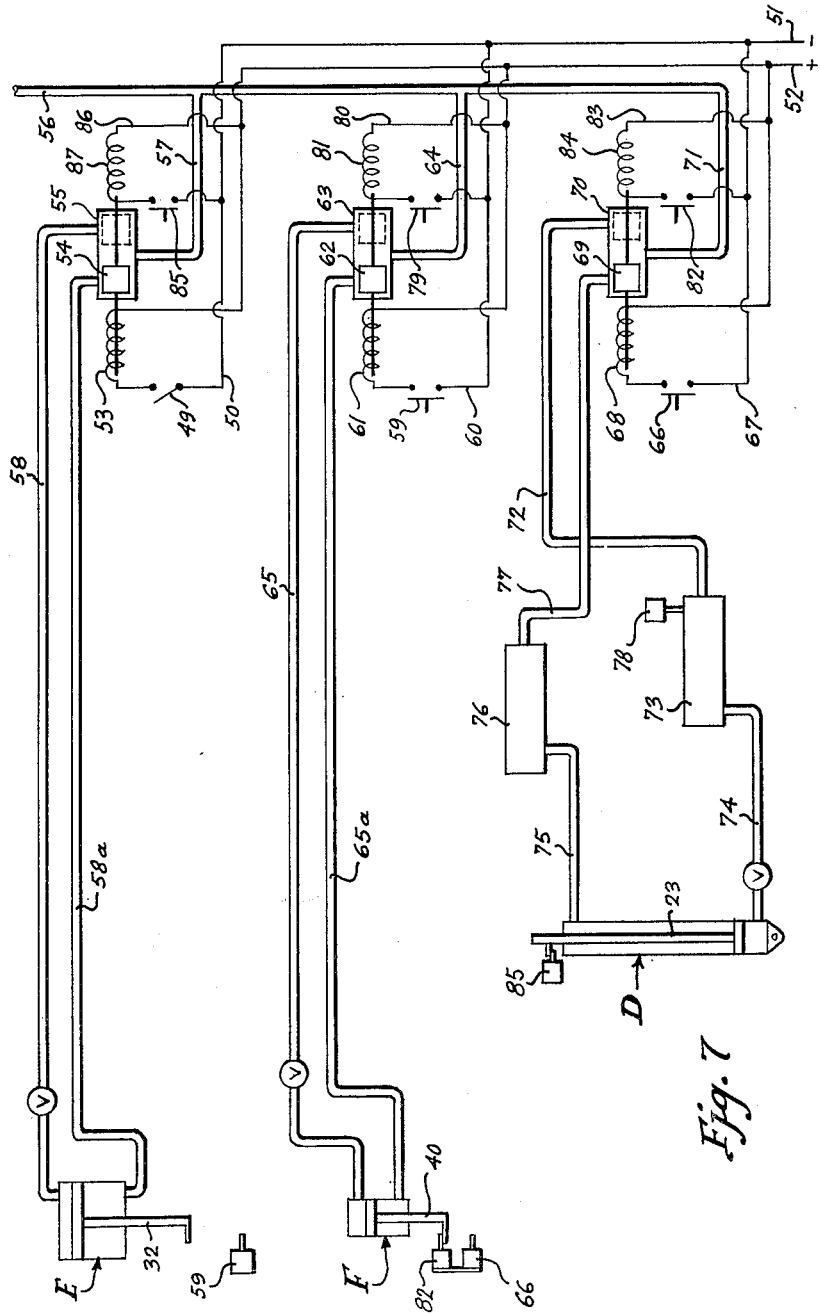
Figure 7 is a schematic illustration of the main operating elements of the machine and switch and circuit details, for the better understanding of the sequence and general operation of the machine.

When the tensioning heads 26 of the tensioning units D have been moved outwardly to their normal operating position by the downward actuation of plate 41, the pistons in cylinders 22 of units D are actuated. This is done by fluid pressure, preferably pneumatically, from a common source of fluid and under uniform pressure. Therefore, as the piston rods 23 within the cylinders 22 commence to move upwardly, the racks 24 will cause the rotary tensioning elements or pinions 29 to rotate, which, in turn, will cause the spoke nipples to rotate until they have been uniformly tensioned. This tensioning operation may take slightly longer in the case of some nipples as compared with others, having regard to their tension at the start of the operation and also having regard to whether or not the slots in rotary elements 29 have initially been able to straddle the "flats" of the nipples or whether this straddling has taken place just after the elements 29 have been caused to rotate as above referred to. However, regardless of this, the fact that all the units D are operated by a uniform pressure, will result in the fact that the nipples will all be tensioned to substantially correspond in degree within a fine tolerance. Accordingly, therefore, in one simultaneous operation, the spokes of the wheel are tensioned uniformly. This is effected in a series of successive steps by the instrumentalities above referred to and the apparatus is returned to its normal position in a series of steps by the same instrumentalities under control of micro-switches and the like and other means for causing the various functions to be performed in the required sequence. At this point, it will be convenient to refer to the schematic diagram and wiring plan shown in Figure 7, to follow the complete operation of the machine.

The operating cylinders E and F and the cylinders of the tensioning units D are designed to be controlled through solenoid operated valves (of generally known characters) controlled by electrical circuit. Assuming, therefore, that the machine is in inoperative position with the movable clamping element C raised and that a spoked wheel has been disposed on the clamping base, as previously described, with each spoke straddled by the slot 31 of the co-operating rotary tensioning element 29 of units D, the switch 49 (Figure 7) is closed to place circuit 50 in operation, which is connected with the power supply lines 51 and 52 and includes the solenoid coil 53 which operates the solenoid plunger 54 of the reversing three-way valve 55, causing it to move from the dotted line position to full line position. The operating fluid is supplied by the supply line 56 under predetermined pressure so that fluid will flow through the branch line 57 to the valve 55 and then by way of the input line 58 to cylinder E, which cylinder exhausts through the output line 58a and through a suitable exhaust port (not shown) in valve 55. This causes the piston therein to move downwardly and moves the wheel clamping element C connected with the piston rod 32 down towards the clamping base B.

When it about reaches its lower position, the projecting upper end of the spindle of the wheel is engaged by the socketed spring pressed plunger 18, the pressure ring 37 engages the upper peripheral edge of the rim, and the sloped inner surface 16 of element C engaging the bevelled outer periphery 15 of the sliding blocks 12, causes them to move radially inward to clamp the wheel in "true" position. When the movable clamping element C has moved to its lowermost position to effect this complete clamping operation, the piston rod 32 is designed to operate a micro-switch diagrammatically illustrated at 59 (Figure 7), adjacent this cylinder and also in wiring diagram, and which closes the circuit 60 which includes the solenoid 61, designed to actuate the plunger 62 in the three-way valve 63 from its dotted line position to the full line position, by means of the current supplied to the circuit from the supply lines 51 and 52. This permits the operating fluid to flow through branch line 64 through valve 63 to the input supply conduit 65 delivering the fluid to the upper end of cylinder F, which cylinder exhausts through the output line 65a through a port (not shown) in valve 63. The consequent operation of the piston of cylinder F moving its piston rod 40 downwardly, moves the plate 41 in a corresponding direction and through the telescopic toggle links 43 and 43a, swings the spoke tensioning units outwardly as previously described to position the tensioning heads 26 directly adjacent to the inner surface of the wheel rim and causing the slot 31 of each of the rotary tensioning elements 29 to straddle the opposed "flats" of the spoke nipples where they are disposed in a position such that they will enter between the opposed defining walls of these slots. At this point the piston rod 40 has reached the position to operate the micro-switch 66 (diagrammatically shown adjacent rod 40 and also in wiring diagram), closing circuit 67 which includes the solenoid coil 68 to operate valve plunger 69 in the three-way valve 70 from the dotted line position to full line position. As a result, fluid will flow from the supply line 56 through the branch 71 to valve 70 and through the input line 72 to manifold 73 to which is connected the various pipe lines indicated by the numeral 74, to cylinders of the various spoke tensioning units D to operate its piston upwardly, the said cylinders exhausting through the branch lines 75, the manifold 76 and return line 77, which exhausts through a port (not shown) in valve 70.

The raising of each piston rod 23 will raise the racks 24 connected therewith and cause each rotary tensioning element 29 to rotate as previously described. As a result, all spoke nipples initially engaged by the rotary tensioning elements, will commence to rotate and those not quite engaged, will become engaged as their rotary tensioning elements 29 start to rotate, since the coil springs 47 of the toggle link elements 43 and 43a will exert sufficient pressure to cause such engagement immediately that the defining walls of the slot of these rotary tensioning elements become aligned with the "flats" of the spoke nipples in question. Moreover, since the fluid pressure supplied to each cylinder is uniform, each spoke nipple will be caused to rotate to the required degree uniformly to tension the spokes via the spoke nipples, within a reasonably fine tolerance. Thus the tensioning operation is completed.

At this point, however, through suitable media, a further switch is closed to cause reversal of operations. Such media may take different forms, i. e., micro-switches, pressure valves or time delay valves. In the present illustration, I show a pressure valve 78 connected with the manifold 73, operated through any excess pressure built up and designed to actuate switch 79, closing circuit 80 which includes the solenoid coil 81, causing valve plunger 62 to reverse and assume the dotted line position. Consequently, fluid will flow through branch line 64, valve 63 and through the normal return line 65a to the opposite end of cylinder F. The result of this operation raises piston rod 40 of cylinder F and consequently raises plate 41 so that the telescoping toggle links 43 and 43a will cause the tensioning units D to swing inwardly to their normal inoperative position, disengaging the tensioning heads 26 thereof from the spoke nipples. At this point, the micro-switch 82 (shown diagrammatically adjacent rod 40 and also in wiring diagram) is operated to close circuit 83 which includes the solenoid coil 84, causing valve plunger 69 to reverse in valve 70 and to assume its dotted line position so that fluid will flow through the branch line 71 through valve 70 and thence through the normal return line 77 to manifold 76 and via branch lines 75 to the upper end of the cylinders of units D. The pistons therefore are caused to return to their normal position and the piston rods 23 thereof and connected racks 24 will cause the rotary tensioning elements to rotate until all pistons have returned to their normal lowermost position when the slot 31 in each of the rotary tensioning elements 29 will be disposed in complete alignment with the slots 30 of the tensioning heads 26 which is their normal starting position. At the same time, either through a time lag switch or by a set of switches connected in series, one for each of the units D and which may be indicated by the switch 85 (shown diagrammatically adjacent piston rod 23 and also in wiring diagram), the circuit 86 is closed, which includes the solenoid coil 87 causing valve plunger 54 to reverse to its dotted line position so that pressure fluid will flow through the branch line 57 through valve 55 and via the normal return line 58a to the underside of cylinder E, thereby raising its piston and through the piston rod 32, raising the movable clamping element C and this return movement of piston rod 32 may be effected at a controlled speed such as by the employment of a "Norgren" air governor. When the movable clamping element C is returned back to its normal starting or inoperative position, the uniformly tensioned wheel can readily be lifted from the clamping bed, since sliding blocks 12 are automatically returned to normal starting position by means of the springs 13 and the slots in the tensioning heads 26 of the rotary tensioning elements 31 are aligned and open upwardly to permit the passage therefrom of the spokes of the wheel. The machine at this point is held in its inoperative position, since the fluid pressure is maintained against the underside of the piston in operating cylinder E and operation cannot commence again until the switch 49 is closed.

From the foregoing, the principles of the invention will be fully appreciated and that a machine constructed according to the principles embodied is of generally simple construction in comparison to the operations performed. It will be obvious of course that the machine might be varied in a number of respects and it is therefore intended that the generally preferred form of construction described and illustrated should not be interpreted in a limiting sense apart from the limitations imposed by the appended claims.

What I claim as my invention is:

1. In a machine for tensioning wire spoked wheels in which the wheel rim is clamped true, with the spokes and tensioning nipples normally disposed for tensioning, a plurality of movable tensioning units, one for each spoke, having a rotary tensioning element engageable with its spoke inwardly of the wheel rim, means for simultaneously moving said units outwardly towards the rim to engage said rotary elements with the nipples of the spokes, and means for rotating said rotary elements simultaneously to rotate said nipples and tension said spokes.

2. Mechanism as claimed in claim 1 in which said movable tensioning units have a head disposed partially to project above the level of the spokes of the clamped wheel, said head having a slot therein opening upwardly and designed to receive a spoke, the rotary tensioning element in each spoke having a slot therein designed to register with that of the head to receive a spoke when said wheel is placed in the machine, and means for returning said rotary elements to the same position after tensioning of the spokes so that the spokes disengage from the rotary elements as the wheel is removed from the machine.

3. Mechanism as claimed in claim 1 in which the movable tensioning units are swingably mounted on the machine and are comprised by two series of units each disposed at a different angle to the other and designed respectively to engage their tensioning heads with the upper and lower spokes of the clamped wheel.

4. A machine for tensioning wire spoked wheels comprising a frame having a wheel receiving clamping base thereon, a movable clamping unit for clamping said wheel on the base, a plurality of spoke tensioning units carried by the frame and swingable along the radial path of said spokes, a tensioning head on each of said tensioning units, normally positioned inside of the clamped wheel rim, and having a slot designed to straddle a spoke of the wheel, a rotary spoke tensioning element carried by said head having a slot registerable with that of the head to receive a spoke, means for swinging said spoke tensioning units outwardly along the radial path of said spokes to engage said rotary tensioning elements of said heads with the spoke nipples adjacent to the inner periphery of the wheel rim, and means for rotating said rotary tensioning elements simultaneously to tension said spokes.

5. A machine for tensioning wire spoked wheels as claimed in claim 4 in which the clamping base includes means movable radially inwardly to engage the wheel rim, said movable clamping unit having means engageable with said movable means, as said unit moves towards its clamping base to move said movable means into clamping engagement with the wheel rim.

6. A machine for tensioning wire spoked wheels as claimed in claim 4 in which the movable clamping unit is provided with spring pressed means for engaging the upper edge of the wheel rim in yieldable clamping engagement when said unit is moved to engage the clamping base.

7. A machine for tensioning wire spoked wheels as claimed in claim 4 in which the swingable tensioning units each comprise a cylinder, a piston therein having a piston rod, a toothed rack in connection with the latter, said cylinder operatively carrying one of said tensioning heads, the rotary tensioning element in said head including a pinion gear engageable with said rack.

8. A machine for tensioning wire spoked wheels as claimed in claim 7 in which the rotary tensioning elements comprise a pinion gear slotted from end to end radially inwardly between two of its teeth at least to the center of the gear, said gear being rotatably mounted in the tensioning head, the latter being recessed for passage of the rack therethrough, said recess exposing the teeth of said gear for engagement with the teeth of the rack.

9. A machine for tensioning wire spoked wheels as claimed in claim 4 and in which the spoke nipples are formed with flattened sides to facilitate turning thereof, said means for swinging said spoke tensioning units including spring means yieldable to position the tensioning heads at least in engagement with the end of the spoke nipples, said slots of the rotary tensioning elements straddling the flattened sides of the nipples when said "flats" are aligned with the sides of the slots, said spring means causing the slots of rotary tensioning elements which engage the ends of said nipples to straddle the nipples having disaligned "flats" when said rotary tensioning elements are rotated.

10. A machine for tensioning the wire spoked wheels comprising a frame having a wheel receiving clamping base thereon, a movable clamping unit for clamping said wheel on the base, a plurality of spoke tensioning units carried by the frame and swingable along the radial path of said spokes, a tensioning head on each of said tensioning units and disposed partially to project above the level of the spokes of the clamped wheel, each head having a slot therein opening upwardly and designed to receive a spoke as the wheel is positioned on the base to be clamped, said heads being normally disposed inwardly of the wheel frame, a rotary spoke tensioning element carried in each head, having a slot registerable with that of the head to receive a spoke, said rotary elements each including gear teeth, said tensioning units including a cylinder, a piston therein having a piston rod and a toothed rack in connection with each of said piston rods to engage the gear teeth of said rotary tensioning elements, said tensioning heads being slotted for passage therethrough of said racks, means for swinging said spoke tensioning units outwardly along the radial path of said spokes to engage said rotary tensioning elements with the spoke nipples adjacent to the inner periphery of the wheel rim, fluid means for operating said pistons to cause rotation of the rotary tensioning elements by said racks simultaneously to tension all spokes of the clamped wheel.

11. In a machine for tensioning wire spoked wheels in which the wheel rim is clamped true with the spokes and tensioning nipples normally disposed for tensioning, a plurality of movable tensioning units, one for each spoke, having a slotted rotary tensioning element engageable with its spoke through its slot, inwardly of the wheel rim, each alternative tensioning unit being disposed at a predetermined angle to engage their rotary tensioning elements with the uppermost of the spokes in the clamped wheel, the remaining units being disposed at a predetermined different angle to engage their rotary tensioning element with the lowermost of the spokes of the clamped wheel, means for simultaneously moving all of said units outwardly towards the rim of the wheel to engage their rotary elements with the nipples of the spokes and means for rotating said rotary elements simultaneously to rotate said nipples and tension said spokes.

12. A mechanism as claimed in claim 11 in which the means for moving all of said units outwardly includes a vertically movable rod disposed along the axial center of said machine, a plate-like element carried by said rod and toggle link means pivotally connected between said plate-like element and said units, said toggle link means of the alternate units being connected to said plate-like element at a level above and in a location radially outward of the connection between said plate-like element and the toggle links for the remaining units.

LEONARD SHAKESBY.

REFERENCES CITED

The following references are of record in the file of this patent:

UNITED STATES PATENTS

| Number | Name | Date |
|---|---|---|
| 1,499,728 | Hanson | July 1, 1924 |
| 2,101,888 | Ambrosius | Dec. 14, 1937 |
| 2,351,355 | Merrett | June 13, 1944 |
| 2,422,593 | Smith | June 17, 1947 |

FOREIGN PATENTS

| Number | Country | Date |
|---|---|---|
| 284,043 | Great Britain | Jan. 26, 1928 |
| 481,236 | Germany | Aug. 19, 1929 |